No. 645,803. Patented Mar. 20, 1900.
W. R. GOOD.
BICYCLE HANDLE BAR.
(Application filed July 22, 1899.)
(No Model.)

WITNESSES:
Chas. B. Nevin.
Carl H. Noe.

INVENTOR:
Wm. R. Good
By R. J. McCarty
ATTORNEY:

UNITED STATES PATENT OFFICE.

WILLIAM R. GOOD, OF DAYTON, OHIO.

BICYCLE HANDLE-BAR.

SPECIFICATION forming part of Letters Patent No. 645,803, dated March 20, 1900.

Application filed July 22, 1899. Serial No. 724,768. (No model.)

*To all whom it may concern:*

Be it known that I, WILLIAM R. GOOD, a citizen of the United States, residing at Dayton, in the county of Montgomery and State of Ohio, have invented certain new and useful Improvements in Bicycle Handle-Bars; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in bicycle handle-bars, and possesses the novel features hereinafter set forth in the specification and pointed out in the claim.

Figure 1:
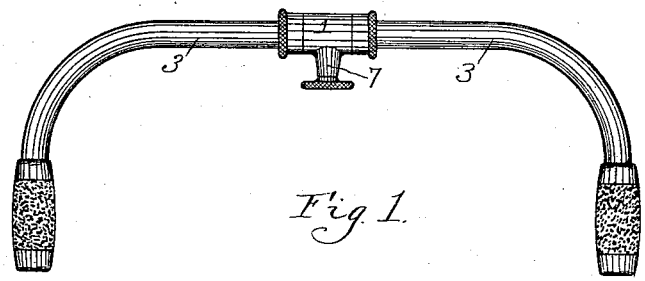
Figure 2:
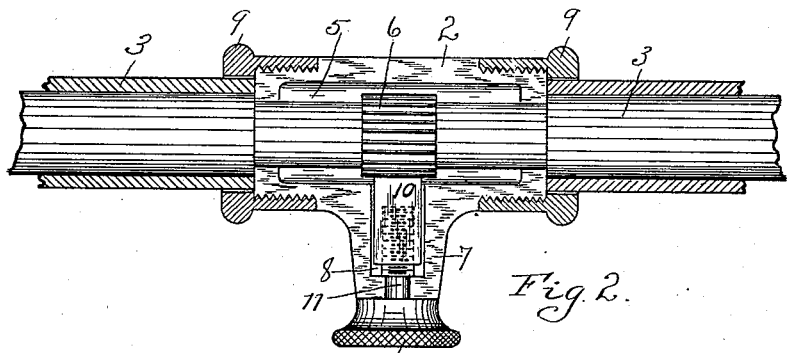
Figure 3:
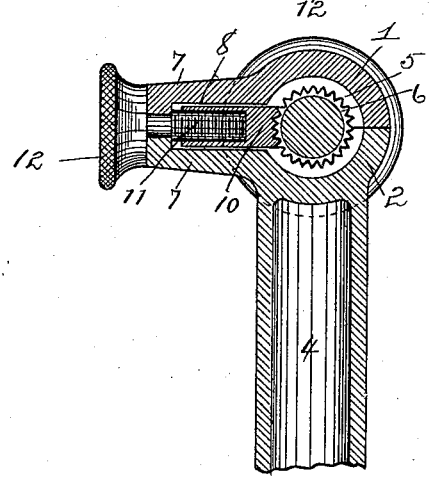

Referring to the accompanying drawings, Figure 1 is a top plan view of a bicycle handle-bar having my improvements. Fig. 2 is an enlarged horizontal section through the central part of the handle-bars. Fig. 3 is a vertical section through the center of the handle-bars.

1 and 2 designate the two halves which together constitute a box that incloses the central part of the handle-bars 3 3, otherwise known as the "steering-head." One half of said box terminates in a stem or tubular portion 4, which joins the frame of the bicycle. (Not shown.) The said box so constructed has an interior longitudinal chamber 5, which houses a ratchet-wheel 6, fixed to the center of the handle-bars. Both halves of the said box have uniform extensions 7, in which there is a chamber 8, that communicates with the chamber 5 at a central point of the latter. The extensions 7 project rearwardly. The two halves thus constituting the box are maintained in position by means of screw-caps 9 9, which fit over the handle-bars and screw onto the ends of the box.

10 designates a block or dog lying within the chamber 8 and penetrated from its outer end by a screw 11, which has fixed to its outer end a turn-piece or finger-wheel 12, the latter forming an ornamentation of the end of the rearwardly-extended portion of the box.

The inner end of the dog 10 has a corrugated surface which adapts it for engagement with the ratchet-wheel 6. By turning the finger-wheel 12 in one or the other direction the dog may be made to engage or release the ratchet-wheel, the screw 11 giving the necessary movement to said dog owing to the inability of the latter to turn with the screw. The adjusting device above described is easy to manipulate and affords a securing of the handle-bars in a reliable manner at whatever position they may be set.

Having fully described my invention, I claim—

In an adjustable handle-bar, the combination of a box consisting of two parts 1 and 2 the latter being an integral part of the stem, the said box having a rearward extension 7 above and in line with the stem, a ratchet-wheel secured to the center of the handle-bar within said box, a dog housed within the rearward extension 7 in a horizontal plane with said ratchet-wheel and adapted to engage directly therewith, a screw engaging directly with said dog by penetrating the end thereof, and adapted to move it to and from the ratchet-wheel, and screw-caps 9 9 inclosing the ends of the box and holding the parts in rigid contact with the handle-bars, substantially as described.

In testimony whereof I affix my signature in presence of two witnesses.

WILLIAM R. GOOD.

Witnesses:
R. J. MCCARTY,
B. F. HENLEY.